(12) United States Patent
Ingram et al.

(10) Patent No.: US 8,515,716 B2
(45) Date of Patent: Aug. 20, 2013

(54) REMOTE MATERIAL IDENTIFICATION PROCESS PERFORMANCE PREDICTION TOOL

(75) Inventors: Paul M. Ingram, Dallas, TX (US);
Joseph C. Landry, Dallas, TX (US);
John J. Coogan, Bedford, TX (US);
Paul D. Shocklee, Plano, TX (US)

(73) Assignee: Raytheon Company, Waltham, MA (US)

( * ) Notice: Subject to any disclaimer, the term of this patent is extended or adjusted under 35 U.S.C. 154(b) by 414 days.

(21) Appl. No.: 12/851,844

(22) Filed: Aug. 6, 2010

(65) Prior Publication Data

US 2012/0035900 A1    Feb. 9, 2012

(51) Int. Cl.
*G06G 7/48* (2006.01)
*G06F 7/60* (2006.01)
*G06F 17/10* (2006.01)

(52) U.S. Cl.
USPC .................................................. 703/6; 703/2

(58) Field of Classification Search
None
See application file for complete search history.

(56) References Cited

U.S. PATENT DOCUMENTS

2009/0297021 A1* 12/2009 Islam et al. .................... 382/160

OTHER PUBLICATIONS

Kerekes et al. "Characterization of material reflectance variation through measurement and simulation", May 2010, Proc. of SPIE vol. 7695, 11 pages.*
Ientilucci et al. "Impact of BRDF on Physics Based Modeling as Applied to Target Detection in Hyperspectral Imagery", 2009, Proc. of SPIE vol. 7334, 12 pages.*
Healey et al. "Models and Methods for Automated Material Identification in Hyperspectral Imagery Acquired Under Unknown Illumination and Atmospheric Conditions", 1999, IEEE Transactions on Geoscience and Remote Sensing, vol. 37, No. 6, pp. 2706-2717.*
Strackerjan et al. "Modeling the Spectral Effects of Water and Soil as Surface Contaminants in a High Resolution Optical Image Simulation", 2006, IEEE, pp. 3757-3760.*
"An Atmospheric Correction Algorithm for Hyperspectral Imagery," Sanders, Lee C.; Doctoral Dissertation, Rochester Institute of Technology, 1999 (188 pages).
"The emperical line method for the atmospheric correction of IKONOS imagery," Karpouzli, E. et al., International Journal of Remote Sensing, ISSN1366-5901, copyright 2003 (8 pages).
U.S. Appl. No. 13/100,878, filed May 4, 2011, entitled "In-Scene Determination of Aerosol Parameters From Imagery," (30 pages).
U.S. Appl. No. 12/851,991, filed Aug. 6, 2010, entitled "Remote Identification of Non-Lambertian Materials," (89 pages).
"A Review of Reflectance Nomenclature Used in Remote Sensing," Carol J. Bruegge, et al., dated Jan. 7, 2000 (10 pages).

(Continued)

*Primary Examiner* — Suzanne Lo
(74) *Attorney, Agent, or Firm* — Schwegman Lundberg & Woessner, P.A.

(57) ABSTRACT

In accordance with the present disclosure, a computer implemented system and method predicts the performance for a remote material identification process under real conditions and uncertainties. The method and system transforms data representing measured reflectance values for candidate materials based on environmental conditions, and uncertainties regarding the environmental conditions and/or calibration of sensors measuring radiance values into the performance predictions for a material identification process operating under those conditions and uncertainties. The performance predictions can be communicated to a designer of, for example, a multi-angle material identification system for use in selecting and setting up the system, or communicated to a consumer of images captured by the material identification system for use in interpreting results of application of the material identification process to real imagery acquired with remote sensors.

45 Claims, 5 Drawing Sheets

(56) References Cited

OTHER PUBLICATIONS

"Three-Dimensional Appearance Characterization of Diffuse Standard Reflection Materials," Andreas Hope, et al., pp. 295-304, published Apr. 29, 2010 (11 pages).
"Lava Flow Identification and Aging by Means of LiDAR Intensity: The Mt. Etna Case," Francesco Mazzarini, et al., J. Geophys. Res., vol. 112, No. B2, Feb. 2007 (43 pages).
"Pixel Identification Techniques Using Hybrid Spectral Algorithms and Physics Based Models," prepared for NGA, Rochester Institute of Technology, College of Science, Center for Imaging Science, Digital Imaging and Remote Sensing Laboratory, Rochester, New York, US, Dec. 2009 (9 pages).
"Optical Remote Sensing of Benthic Habitats and Bathymetry in Coastal Environments at Lee Stocking Island, Bahamas: A Comparitive Spectral Classification Approach," Eric M. Louchard, et al., pp. 511-521, dated Oct. 1, 2001 (11 pages).
"Models and Methods for Automated Material Identification in Hyperspectral Imagery Acquired Under Unknown Illumination and Atmospheric Conditions," Glenn Healey, et al., IEEE Transactions on Geoscience and Remote Sensing, vol. 37, No. 6, Nov. 1999, pp. 2706-2717 (12 pages).
"Hyperspectral Image Processing for Automatic Target Detection Applications," Dimitris Manolakis, et al., Lincoln Laboratory Journal, vol. 14, No. 1, dated 2003, pp. 79-116 (38 pages).
"Introduction to Hyperspectral Imaging," Randall B. Smith, MicroImages, Inc., dated Jul. 14, 2006 (24 pages).
"Tensor Methods for Hyperspectral Data Analysis: A Space Object Material Identification Study," Qiang Zhang, et al., Optical Society of America, copyright 2008 (46 pages).
"Spectral Imaging for Remote Sensing," Gary A. Shaw, et al., Lincoln Laboratory Journal, vol. 14, No. 1, 2003, pp. 3-28 (26 pages).
"Bidirectional Reflectance Distribution Function and Hemispherical Reflectance of JSC Mars-1," Georgi T. Georgiev, et al., Society of Photo-Optical Instrumentation Engineers, copyright 2002, pp. 165-175 (11 pages).
"Shadow-Insensitive Material Detection/Classification with Atmospherically Corrected Hyperspectral Imagery," Steven M. Adler-Golden, et al., SPIE, 2000, vol. 4381, Algorithms for Multispectral, Hyperspectral and Ultraspectral VII, pp. 460-469, (10 pages).
"Target Detection and Classification at Kernel Blitz 1997 Using Spectral Imagery," Jeffrey D. Sanders, Thesis, Naval Postgraduate School, Dec. 1998 (115 pages).
"Development of Global Aerosol Models Using Cluster Analysis of Aerosol Robotic Network (Aeronet) Measurements," Ali H. Omar, et al., published Mar. 1, 2005 (14 pages).
"Iterative Retrieval of Surface Emissivity and Temperature for a Hyperspectral Sensor," Christoph A. Borel, submitted to the proceedings for the First JPL Workshop on Remote Sensing of Land Surface Emissivity, May 6-8, 1997 (8 pages).
Ben-Dor, Eyal, "Better Analysis of Hyperspectral Images by Correcting Reflectance Anisotropy", SPIE Newsroom, (Apr. 7, 2010), 3 pgs.
Lentilucci, Emmett J, et al., "Impact of BRDF on Physics Based Modeling as Aplied to Target Detection in Hyperspectral Imagery", Proc. of SPIE vol. 7334, (Apr. 13, 2009), 12 pgs.
Remer, et al., "Algorithm for Remote Sensing of Tropospheric Aerosol from MODIS: Collection 5", Algorithm Theoretical Basis Document, [Online]. Retrieved from the Internet: <http://modis.gsfc.nasa.gov/data/atmos_atbd.php>, (Nov. 1, 2006), 87 pgs.
Robert, Ryan E, "A Simplified Approach to Radiometric Vicarious Calibration", (Aug. 2010), 1 pg.
Roberts, Dar A, et al., "Image Spectrometry of Urban Materials", (Mar. 2004), 31 pgs.
Zhang, Hanlu, et al., "Measurement and Statistical Modeling of BRDF of Various Samples", Optica Applicata, vol. XL, No. 1,, (Mar. 2010), 12 pgs.

\* cited by examiner

REMOTE MATERIAL IDENTIFICATION PROCESS PERFORMANCE PREDICTION TOOL

The U.S. government may have certain rights in this invention pursuant to its funding under contract No. 2004-K724300-000.

FIELD

The present disclosure generally relates to material identification processes, and relates in particular to a performance prediction tool for such processes.

BACKGROUND

Material identification using a remotely located sensor is used for a number of purposes, for example detection, identification and classification of objects within a scene, and applications, for characterization of urban areas, search and rescue, differentiating combatant forces, and detection of attempts at camouflage, denial and deception. It is based on the general principle that the observed spectral radiance of any given target will vary based on, among other things, the type of the material of which the surface of the target is made. Different materials absorb, reflect and emit differently, depending on wavelength. The spectral radiance of a target—the surface of a particular object within a scene—from a given angle or direction can be measured using various types of sensors, depending on the wavelengths of interest. Based on the measured or observed spectral radiance it is possible to determine the material of which the surface is made.

Several types of remote sensors and imaging modalities have been used to generate image sets containing both spectral and spatial information of real scenes for purposes of detection, identification or classification of objects within the scene. Electro-optical sensors are typically single band, multispectral or hyperspectral. A multispectral sensor detects and records radiation in a limited number of bands that are typically fairly wide, for example in the red, blue, green, and near-infrared bands of the spectrum. A hyperspectral sensor detects radiation in a large number of contiguous bands, typically throughout the visible and near-infrared regions of the spectrum. Other types of imaging modalities, for example, synthetic aperture radar (SAR), typically operate only in a single band. The sensors are typically (but do not have to be) placed in satellites or aircraft and acquire images of portions of the surface of the earth during flyovers at relatively high altitudes. However, it is possible for the sensors to be placed on the ground.

Each "image"—also called "imagery" or "image set"—of a scene generated by such a sensor comprises spatial information, typically in two dimensions. It also contains spectral radiance information, which would include the radiance of at least one predetermined band of wavelengths that the sensor can detect. The material of which at least the surface of an object within the scene is made—the "target"—is identified by selecting within the image the pixels comprising the target and evaluating the spectral radiance to develop a spectral signature for that target that can be compared to known spectral signatures of various materials. In automatic material identification a specially programmed computer is used to process image data from a remote sensor and other data to identify the material of the target.

The spectral radiance—radiance at a given wavelength or band—for any given target in a scene will depend on the material of which the target is composed (the "target material"), as well as the spectrum and angle of irradiation being reflected by the target, the atmospheric conditions through which both the illuminating irradiation and the reflected radiation travels, and the spectrum of any emitted radiation. In order to make the identification, measured spectral radiance is typically transformed to an estimated reflectance. Reflectance is the ratio of the measured radiance from an object divided by the radiance reflected by a 100% Lambertian reflector. When using images of real targets, reflectances are estimated by taking into account relevant environmental conditions, such as the radiation source and atmosphere, under which the imagery was acquired.

The way in which a surface reflects or emits radiation can be generally categorized as either Lambertian or non-Lambertian. A Lambertian surface scatters electromagnetic radiation equally in all directions, without regard to the direction of illumination. Thus, its reflectance is generally isotropic or the same in all directions. A non-Lambertian surface does not scatter incident electromagnetic radiation equally in all directions. Examples of non-Lambertian surfaces include those that are backscattering, meaning that the light scatters predominantly toward the illumination source; forward scattering, meaning scattering predominantly in directions away from the illumination source; and specular, meaning reflecting the illumination source like a mirror. Many man-made objects or targets exhibit non-Lambertian reflectance.

SUMMARY

In accordance with the present disclosure, a computer implemented system and method predicts the performance for a remote material identification process under real conditions and uncertainties. The method and system transforms data representing measured reflectance values for candidate materials based on environmental conditions, and uncertainties regarding the environmental conditions and/or calibration of sensors measuring radiance values into the performance predictions for a material identification process operating under those conditions and uncertainties. The performance predictions can be communicated to a designer of a material identification system for use in selecting and setting up the system, or communicated to a consumer of images captured by the material identification system for use in interpreting results of application of the material identification process to real imagery acquired with remote sensors.

To identify a material within an image, the remote material identification process may be treated as Lambertian, meaning that its spectral signature does not change with illumination or viewing geometry, or non-Lambertian. If the materials are processed to be Lambertian, the directional hemispherical reflectance (DHR) for each candidate material, which relates, for a given wavelength or band of wavelengths and direction of incident irradiation, reflected radiance across the entire hemisphere, is used to predict the spectral reflectance of the candidate material. The target may also be treated as non-Lambertian, meaning that its spectral signature changes with illumination and viewing geometry. The candidate materials are also treated as non-Lambertian. The bi-directional reflectance distribution function (BRDF) for each candidate material, which relates, for a given wavelength or band of wavelengths and direction of incident irradiation, reflected radiance in the direction of the sensor, is used to predict the spectral reflectance of the candidate material.

DETAILED DESCRIPTION OF EXEMPLARY EMBODIMENTS

In the following description, like numbers refer to like elements.

Figure 1:
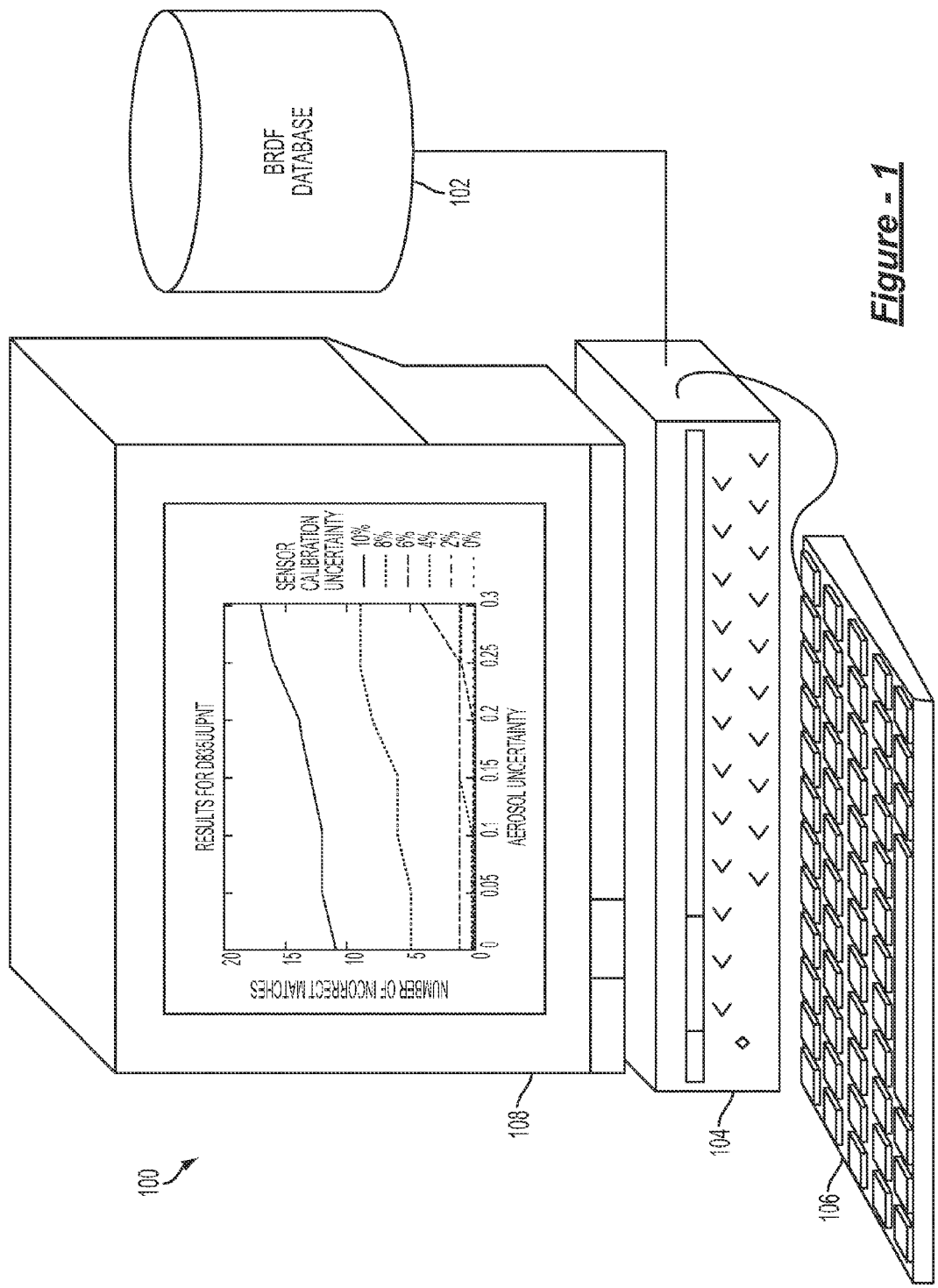
FIG. 1 is a conceptual block diagram illustrating a computerized apparatus for predicting the performance of a FIG. 2 is a system block diagram illustrating a computer implemented system for predicting the performance of a remote sensor material identification process under one or more environmental conditions and uncertainties.

Referring to FIG. 1, a performance prediction tool (PPT) 100 is one example of a system performing a method for quantifying performance of a remote identification process based on real environmental conditions and uncertainties associated with measurements and other aspects of the material identification process. The material identification process provides a method for identifying target materials by comparing their spectral signatures to candidate spectral signatures estimated using a database of bi-directional reflectance distribution function (BRDF) measurements of materials. The BRDFs are based, at least in part, on spectral measurements taken of actual materials. One example of a BRDF database is the Nonconventional Exploitation Factor (NEF) database. NEFDS is a set of software programs for use in obtaining information for a given material from the NEF database. Described in a patent application, entitled "Remote Identification of Non-Lambertian Materials," filed concurrently herewith, and naming Joseph C. Landry, Paul M. Ingram, John J. Coogan and Paul D. Shocklee as inventors, is a description of a material identification process for non-Lambertian materials that utilize a multi-angle spectral signature for material identification. The disclosure of the aforementioned patent application is incorporated herein in its entirety for any and all purposes.

The PPT 100 is comprised of, in one embodiment, a specially programmed computer. The computer is comprised of one or more processors for executing programmed instructions stored in a memory or other computer readable medium. The instruction causes the computer to perform the steps of the processes described below. The PPT 100 is further comprised of, or has access to, the BRDF database 102. The BRDF database may be local or remote. The PPT 100 quantifies the performance as a function of the sensor system and environmental parameters and their uncertainties. These environmental parameters and uncertainties are given values provided to a computer processor 104 of the PPT 100 via a user input device 106 connected to the computer processor 104, such as a keyboard, mouse, or other input device or network link to such a device. The computer processor 104 can provide this performance information to a user by a user output device 108 connected to the computer processor, such as a dynamic display, printer, or other local device connected to the computer by a local interface or network link. This information can be provided, for example, to a system designer to set requirements on system parameters such as sensor radiometric and spectral calibration uncertainty and aerosol parameter uncertainty. It can alternatively or additionally be provided to a user of the remote material identification process as an aid in deciding how much confidence to attribute to an identification.

Performance of a material identification process is expressed in terms of two kinds of mistakes that can occur during a material identification process. The first kind of mistake occurs when the correct candidate material is declared not to match the target (a missed detection or "miss"). These mistakes are characterized by the probability of detection $P_d$, which is actually the probability of the complementary event, i.e. of a "hit". The second kind of mistake occurs when an incorrect candidate material is declared to match the target (a false alarm). These mistakes are characterized by the probability of false alarms $P_{fa}$. Performance is expressed as the $P_{fa}$ associated with a given $P_d$. Paired ($P_d$, $P_{fa}$) values can be used to construct receiver-operator characteristic (ROC) curves for describing the performance of hypothesis tests like the one used in the PPT 100. Such a curve can be displayed or otherwise communicated to a user via user output device 108 (FIG. 1). Paired ($P_d$, $P_{fa}$) values can also be used to construct curves, like the ones graphically represented in FIG. 5, discussed below, to characterize the number of incorrectly matched materials for a given value of $P_d$ and given levels of uncertainty in various input parameters. Alternatively, the information can be communicated in the form of a table like Table 5, discussed below.

Figure 4:
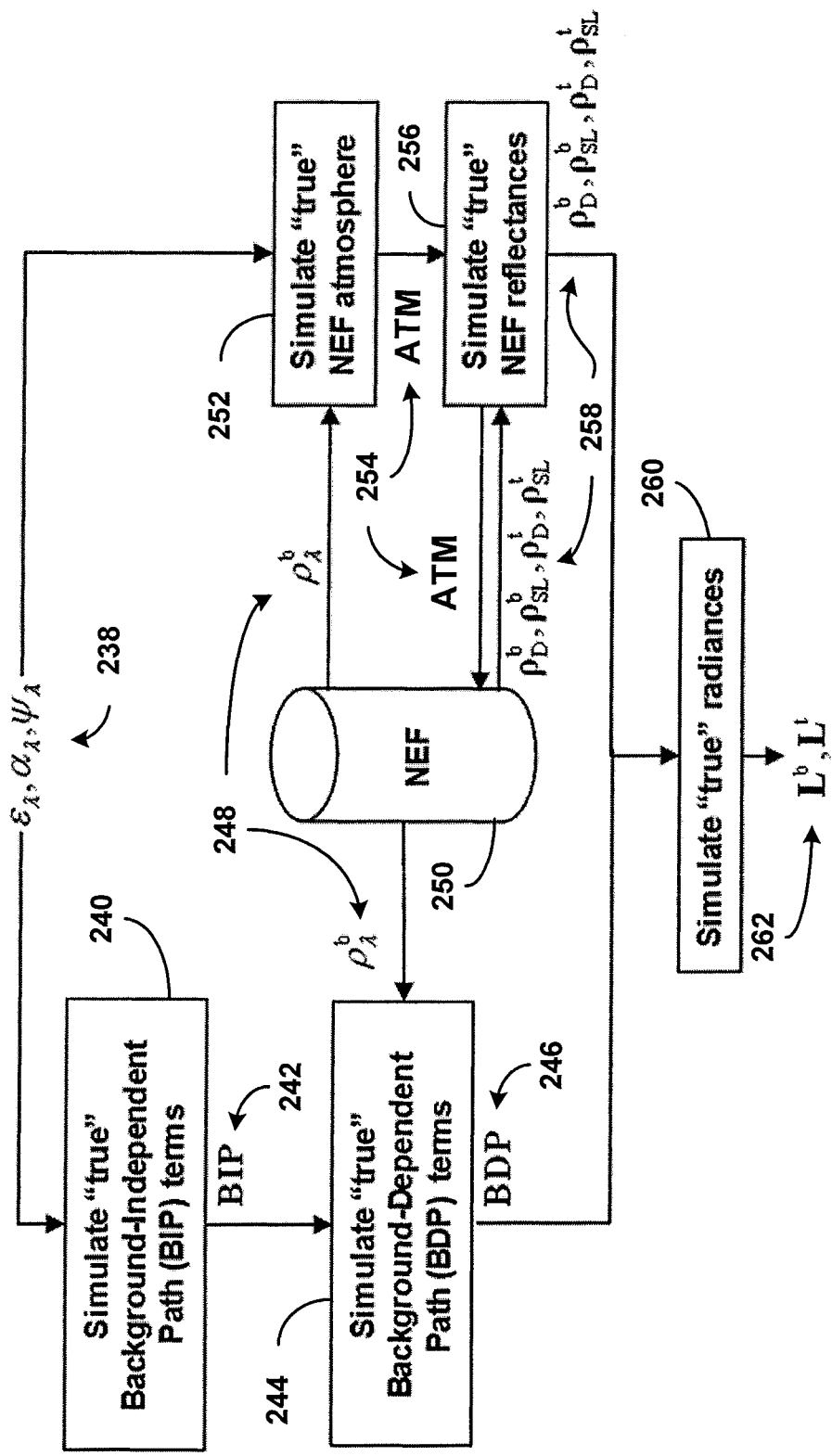
FIG. 4 is a system block diagram illustrating a computer implemented system for simulating a "true" multi-angle target signature for a non-polarimetric reflective and/or emissive, multi-spectral (MS), multi-angle material identification process.
Figure 5:
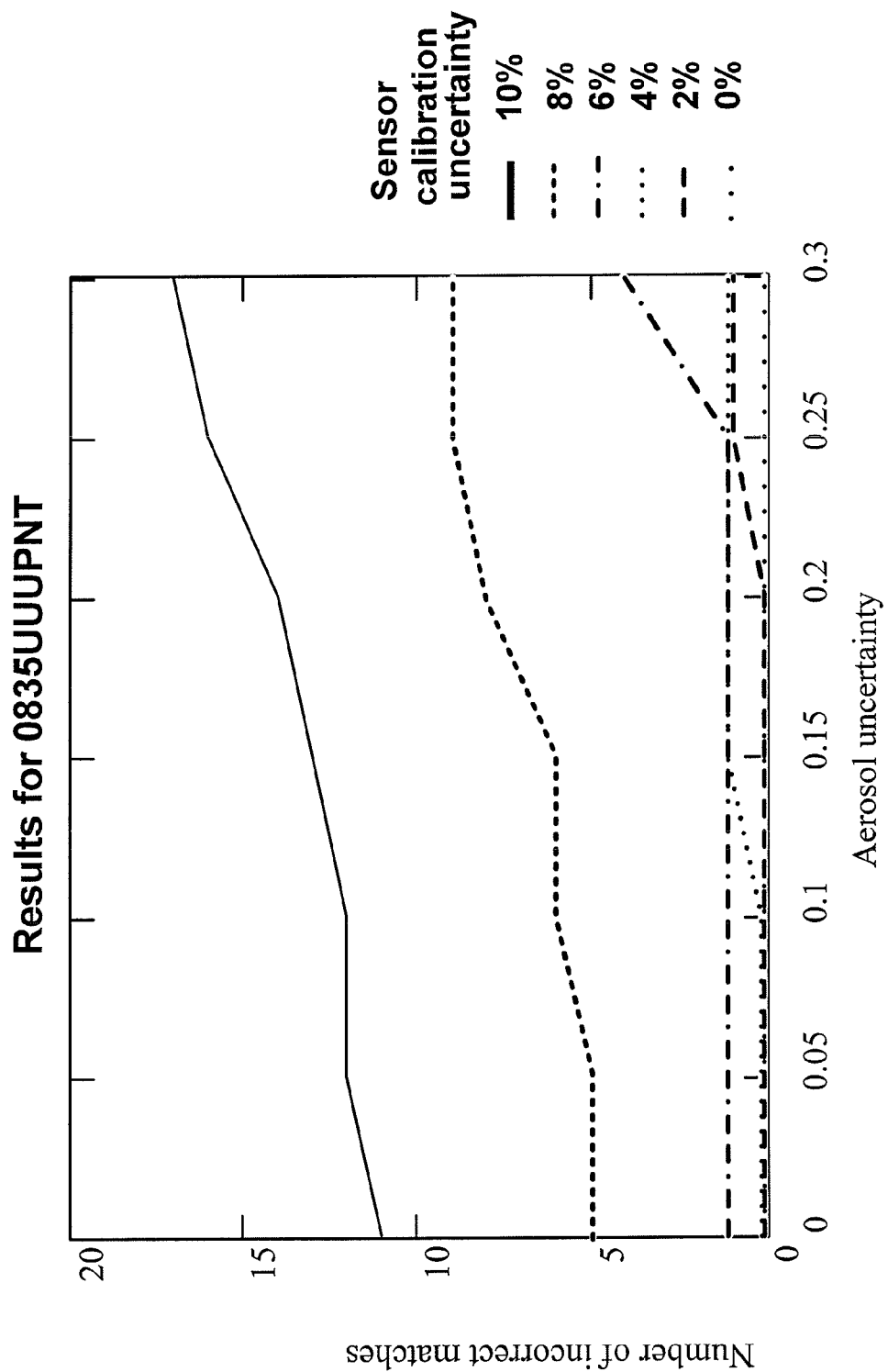
FIG. 5 is a graphical representation illustrating an example of performance predictions for a multi-angle material identification process.

The PPT can allow the user to determine $P_{fa}$ values for a given value of $P_d$, or vice versa, as a function of one or more system and environmental parameters, and thus to quantify changes in performance with changing system requirements, scene content and environmental knowledge. Examples of such system and environmental parameters are:

Acquisition geometry (sun and sensor angles) of each image
Target and background materials present in the scenes
Atmospheric conditions and uncertainties
Sensor radiometric and spectral calibration parameters and uncertainties
Candidate material BRDF measurements and uncertainties
Orientation of the surface normal of the target and uncertainties The PPT can be employed with various imaging modalities as follows:

Non-polarimetric reflective and/or emissive, multi-spectral (MS) or hyperspectral (HS)
Polarimetric spectral reflective and/or emissive, MS or HS
Synthetic aperture radar (SAR) and other active sensing modalities The components in an example of a PPT 100 are described with reference to FIG. 2, while a generalized example of a PPT method is described with reference to FIG. 3. FIG. 4 and related discussion provide a full description of one example of a process performed by the PPT 100 for a material identification process using non-polarimetric (non-PI) reflective MS imagery. FIG. 5 and Tables 1-5 give three example applications of the PPT to non-PI reflective MS imagery, showing how it characterizes the performance of the algorithm.

Figure 2:
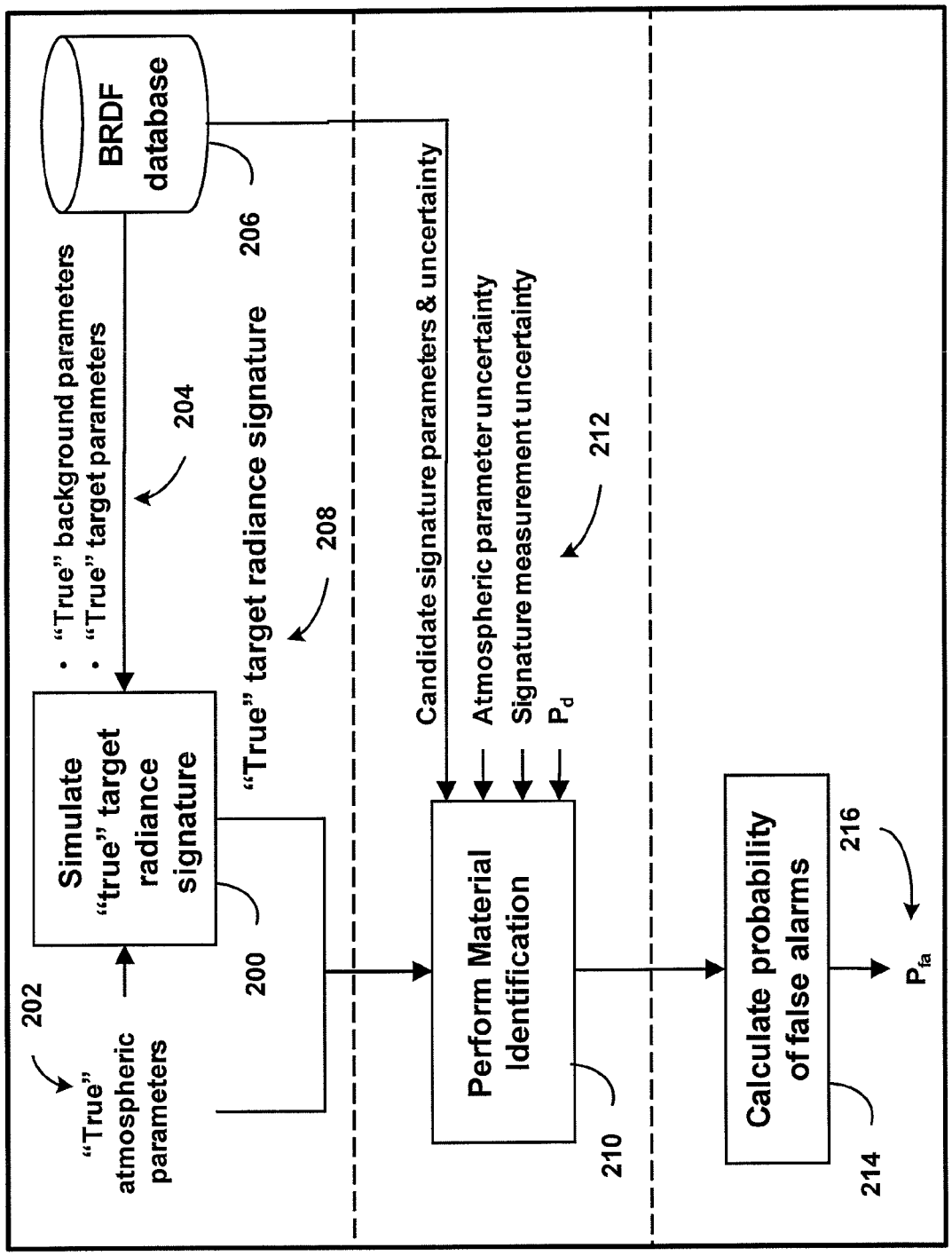

Referring to FIG. 2, the performance prediction process carried out by, for example, the PPT process and system is organized into three primary components that accomplish the performance predictor tool. First, simulation component 200 takes as input atmospheric parameters 202 provided by a user, and background and target data 204 from a BRDF database 206, including background parameters and target parameters, all of which are taken to be "true." Simulation component 200 utilizes this input to generate at least one target signature 208 by simulating a ground truth imagery collection campaign of known targets and backgrounds by modeling the target and background radiance signatures. The simulated "true" target and background radiance signatures are determined for a given imaging modality from a given angle. True signature radiances for more than one angle can be simulated. Then a material identification process 210 is executed with "true" target signature 208 and "true" atmospheric parameters 202, with additional input 212 to generate the results for the material identification process. The additional input 212 includes candidate signature parameters and uncertainty for the target material and each candidate material used in the material identification process. The additional input 212 also includes uncertainties that can be specified by a system user, such as given measurement uncertainties for atmospheric parameters and signature measurement, and a given probability of detection $P_d$. Finally, a performance assessment component 214 uses these results to calculate the probability of a false alarm ($P_{fa}$) 216 associated with a given candidate material.

Figure 3:
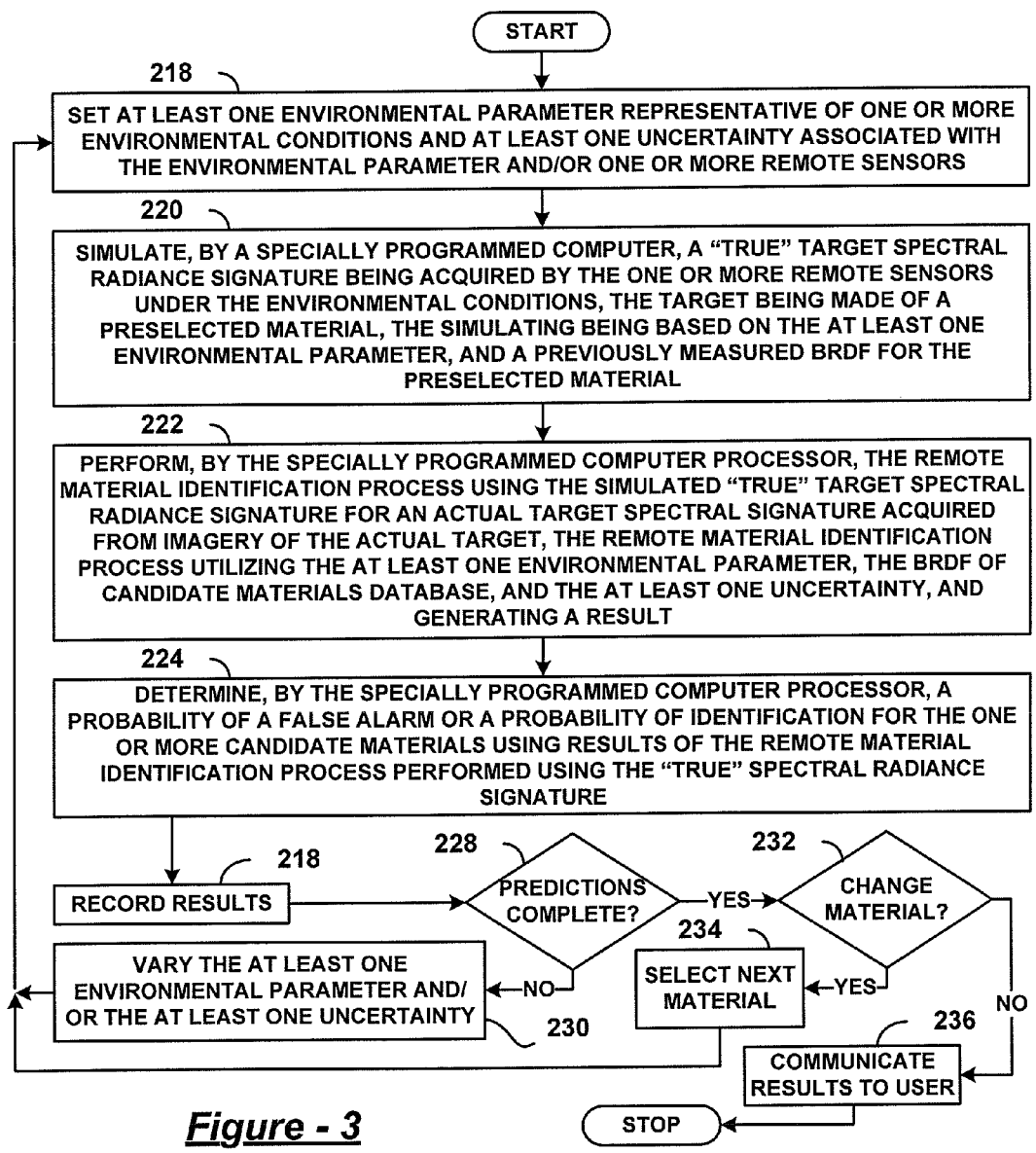
FIG. 3 is a flow diagram illustrating a computer implemented method for predicting the performance of a remote sensor material identification process under one or more environmental conditions and uncertainties.

Turning to FIG. 3, the illustrated computer-implemented performance prediction method transforms specific information regarding measured material reflectance information from a BRDF database into performance predictions. These performance predictions predict performance of a remote material identification process being used to identify the material of which real targets are made using imagery processed from one or more remote sensors. The performance predictions are communicated to designers and users of the remote material identification process, and/or consumers of imagery analyses carried out according to the remote material identification process. The computer-implemented method can be used to predict the performance of a remote sensor material identification process using real imagery under different conditions—for example, different target materials, different backgrounds, different sensors, different acquisition angles, different imaging modalities, and different characteristic conditions—and uncertainties, such as uncertainties arising from characterization of atmospheric conditions, with calibration of imagery sensors (both power and spectral), and BRDF parameters.

Beginning at step 218, the method initially sets one or more environmental parameters representative of the one or more environmental conditions and one or more uncertainties. The uncertainties set by the computer at step 218 can be associated with, for example, the environmental parameter or parameters, or calibration of the remote sensor or sensors that will be used in the acquisition of real imagery. A user may specify to the process the environmental parameters, the environmental conditions, and the uncertainties. Step 218 can also include receiving from a user a probability of detection value and setting a probability of detection variable to the received value.

At step 220, the computer-implemented method simulates a "true" target radiance signature that would be acquired by a sensor under "true" environmental conditions. The spectral radiance for one or more bands for a preselected target material and background, are determined using a process illustrated by FIG. 4. These "true" radiances in preselected environmental conditions, substitute for the measured radiance of the selected target material in imagery acquired using the one or more sensors, and are then used as input to the remote material identification process, the performance of which is to be predicted under the preselected environmental conditions, but with uncertainties associated with real world measurement of the environmental conditions and the target radiance, and with the material identification process being tested.

Once the "true" target radiance signature has been simulated at step 220, the method uses this simulated "true" target radiance signature at step 222 to perform a remote material identification process. In the examples given herein, the target signature is comprised of the spectral signature of the target in one or more wavelength bands from one or more acquisition angles. In the material identification process of step 222, this "true" spectral radiance signature for the target substitutes for the spectral radiance of the target obtained from imagery of real terrain containing the target. The remote material identification process carried out in step 222 also utilizes the one or more "true" environmental parameters which were used to simulate the "true" radiance signature of the target, and the uncertainties associated with these parameters that would be present in the real world measurements or knowledge of the environmental conditions (e.g., atmospheric parameter uncertainty). The process carried out in step 222 further uses radiance measurement uncertainty (e.g., the sensor calibration), BRDF parameters for candidate materials used in the identification process, and uncertainties associated with these parameters. The remote material identification process is then executed to identify at least one of the candidate materials of which the target is made. It is assumed that the material identification process utilizes the chi-square test, so step 222 can include utilizing a probability of detection given by the user of the PPT for the material identification process in order to generate the results of the material identification process.

Once the material identification process of step 222 has been completed, the results of that process can be employed at step 224 to determine a probability of a false identification. These results can be recorded at step 226 in a computer readable medium. An environmental parameter or an uncertainty can be varied or changed, as indicated by steps 228 and 230, and the process repeated for step 218. Similarly, the process can be repeated for a different target material, as indicated by steps 232 and 234. The results for all of the conditions, uncertainties, and target materials tested can be communicated to a user or to another program at step 236.

Turning now to FIG. 4, illustrated is an example of a process for determining the background and target radiances. This example is particularly described as it applies to non-polarimetric reflective multi-spectral imagery. Substantially similar processes can be used for other imaging modalities.

Aerosol properties 238 are characterized by the spectral extinction $\epsilon_\lambda$, absorption $\alpha_\lambda$ and asymmetry $\psi_\lambda$ parameters, where $\lambda$ denotes wavelength. The background and target radiance spectra imaged at multiple acquisition geometries in the same pass can be simulated. For this example, it is assumed that the atmospheric conditions along the lines of sight are identical for all images, and only the acquisition angles change.

Assuming that the true aerosol spectral parameters $\epsilon = \epsilon_\lambda$, $\alpha = \alpha_\lambda$, and $\psi = \psi_\lambda$, and other atmospheric parameters are given, two sets of atmospheric correction terms are calculated, one in each branch of the Figure. In the left branch, a first simulation component 240 determines the spectral background-independent path terms (BIP) 242 from aerosol properties 238, including $\epsilon$, $\alpha$, $\psi$, and other environmental parameters. A second simulation component 244 converts these BIP 242 into background-dependent path terms (BDP) 246 using the directional hemispherical spectral reflectance 248, denoted $\rho_\lambda^b$, of the Lambertian background as a function of wavelength $\lambda$ obtained from a BRDF database, which in this example is the NEF database 250, using a preselected background same as might be encountered in actual imagery. In the right branch, a third simulation component 252 determines the NEF atmospheric transmittance and downwelling radiance terms (ATM) 254 from the aerosol properties 238, including $\epsilon$, $\alpha$, $\psi$, and from $\rho_\lambda^b$ 248 from the NEF database. The NEF atmospheric terms are, in this example, calculated assuming that the target is horizontal. A fourth simulation component 256 passes the ATM 254 data to the NEF database 250, where the following aperture effective values (AEV) 258 are computed and returned:

$\rho_D^b$: the directional hemispherical reflectance of the background $\rho_D^t$: the directional hemispherical reflectance of the target $\rho_{SL}^b$: the Lambertian-equivalent solar reflectance of the background $\rho_{SL}^t$: the Lambertian-equivalent solar reflectance of the target Finally, a fifth simulation component 260 determines background and target radiances 262 using the BDP 246 and the AEV 258. For example, the aperture radiance of the background $L^b$ is determined from BDP 246, $\rho_D^b$ and $\rho_{SL}^b$, and the aperture radiance of the target is calculated from BDP 246, $\rho_D^t$ and $\rho_{SL}^t$. The steps in the PPT process are summarized in equation (1.1):

$$\epsilon_\lambda, \alpha_\lambda, \psi_\lambda \to BIP \xrightarrow{\rho_\lambda^b} BDP \qquad (1.1)$$

$$\epsilon_\lambda, \alpha_\lambda, \psi_\lambda, \rho_\lambda^b \to ATM \xrightarrow{NEF} \rho_D^b, \rho_{SL}^b, \rho_D^b, \rho_{SL}^b \xrightarrow{BDP} L^b, L^t$$

These operations are described below.

The spectral BIP terms 242 appropriate for the reflective region can be made up of the following quantities indexed by wavenumber v. These quantities can be determined, for example, as functions of aerosol properties and acquisition geometry using the software program called MODTRAN®, which is a program owned by the U.S. Air Force Research Laboratory, maintained by Spectral Sciences Inc. and distributed by Ontar Corporation:

$L_v^{AS}$—Solar photons that are scattered into the sensor's field of view via single or multiple scatter events within the atmosphere without ever reaching the target or background.

$L_v^{DSR}$—Solar photons that pass directly through the atmosphere to a 100% reflectance Lambertian target, reflect off the target, and propagate directly through the atmosphere to the sensor. Light for this path term is attenuated by absorption and by light scattering out of the path, but no radiance is scattered into the path. This path does not involve any interaction with the background.

$L_v^{SSR}$—Solar photons that are scattered by the atmosphere onto a 100% reflectance Lambertian target, reflect off the target, and propagate directly through the atmosphere to the sensor. This path term does not involve any interactions with the background.

$L_v^{BDSR}$—Solar photons that are directly transmitted to a 100% reflectance Lambertian background, reflect off the background once, and then scatter into the field of view of the sensor.

$L_v^{BSSR}$—Solar photons that are scattered by the atmosphere at least once, reflect off a 100% reflectance Lambertian background once, and then scatter into the field of view of the sensor.

$S_v$—Spherical albedo of the bottom of the atmosphere, which can be thought of as a reflection coefficient of the atmosphere.

The MODTRAN® program can be executed as a separate process on the same computer as the PPT 100 or on a different computer.

The spectral BIP terms 242 can be used to calculate the spectral target radiance $L_v$ as shown in equation (1.2), where $\rho_v^t$ is the NEF AEV of the target spectral reflectance and $\rho_v^b$ is the AEV of the background spectral reflectance.

$$L_v = \rho_v^{SL} L_v^{DSR} + \qquad \ldots \text{target reflected direct solar radiance} \qquad (1.2)$$

$$\frac{\rho_v^D}{1 - \rho_v^b S_v}(\rho_v^b S_v L_v^{DSR} + L_v^{SSR}) + \qquad \ldots \text{target reflected scattered downwell}$$

$$L_v^{AS} + \frac{\rho_v^b}{1 - \rho_v^b S_v}(L_v^{BDSR} + L_v^{BSSR}) \qquad \ldots \text{atmospheric \& background scatter}$$

The NEF database 250 provides the spectral reflectance 248, denoted $\rho_\lambda^b$ of the selected background. Then $\rho_\lambda^b$ is converted to $\rho_v^b$, where v denotes wavenumber. Next, $\rho_v^b$, and the sensor spectral response $R_i(v)$ are spectrally resampled to the uniformly spaced wavenumber samples in the spectral BIP terms 242. Finally, the true band-integrated BDP terms 246 can be determined as shown in equation (1.3) via the extended trapezoidal rule:

$$L_i^{TRDS} = \int L_v^{DSR} R_i(v) dv \qquad (1.3)$$

$$L_i^{TRH} = \int \frac{1}{1 - \rho_v^b S_v}(\rho_v^b S_v L_v^{DSR} + L_v^{SSR}) R_i(v) dv$$

$$L_i^{PSMS} = \int \left[L_v^{AS} + \frac{\rho_v^b}{1 - \rho_v^b S_v}(L_v^{BDSR} + L_v^{BSSR})\right] R_i(v) dv$$

The directional hemispherical spectral reflectance $\rho_\lambda^b$ of the Lambertian background is used to create a MODTRAN "spec_alb.dat" file. This file and the aerosol parameters 238, including $\epsilon$, $\alpha$ and $\psi$, are used to calculate the NEF atmospheric transmittance and downwelling radiance terms ATM 254, which can be made up of the following quantities. These can be determined as functions of wavelength $\lambda$, zenith angle $\theta_i$ and azimuth angle $\phi_i$:

$\tau(\lambda, \theta_i)$—transmittance from target to sensor along a line of sight with zenith angle $\theta_i$.

$L(\lambda, \theta_i, \phi_i)$—radiance incident on the target from direction $(\theta_i, \phi_i)$.

The true band-integrated background radiance $L_i^b$ in band i can be obtained by integrating equation (1.2) with respect to $R_i(v)$ when $\rho_v^t = \rho_v^b$ to obtain equation (1.4):

$$L_i^b = \int \left[L_v^{AS} + \frac{\rho_v^b}{1 - \rho_v^b S_v}(L_v^{DSR} + L_v^{SSR} + L_v^{BDSR} + L_v^{BSSR})\right] R_i(v) dv \qquad (1.4)$$

Alternatively, $L_i^b$ can be evaluated by substituting $\rho_i^{SL} = \rho_i^D = \rho_i^b$ into equation (1.5), where $\rho_i^b$ is the NEF band-integrated AEV value of the background reflectance.

The NEF database 250 is used to calculate the band-integrated AEVs of the target directional hemispherical reflectance $\rho_i^D$ and target Lambertian-equivalent solar reflectance $\rho_i^{SL}$ in each band i. If it is assumed that the target is horizontal, then the true band-effective target radiance in band i is given by equation (1.5):

$$L_i^t = \rho_i^{SL} L_i^{TRDS} + \rho_i^D L_i^{TRH} + L_i^{PSMS} \qquad (1.5)$$

A material identification method is next executed with the target radiance spectra $L^t$ simulated for $N_{images}$ acquisition geometries. It can be assumed that the estimated aerosol spectral parameters $\hat{\epsilon}=\hat{\epsilon}_\lambda$, $\hat{\alpha}=\hat{\alpha}_\lambda$ and $\hat{\psi}=\hat{\psi}_\lambda$ have already been obtained from some source.

The material identification method can assume that errors in each of the $N_{bands}$ component of each measured target radiance spectrum are zero-mean Gaussian random variables with standard deviations that are proportional to the radiance value by a factor $\sigma_{cal}$ which can be set by the user. It can also be assumed that these errors are independent band-to-band and image-to-image. The process can be easily modified to accommodate errors that are correlated band-to-band and image-to-image if such correlation coefficients are available.

The material identification method can also assume that errors in the measured aerosol parameters are zero-mean Gaussian random variables with known standard deviations that are proportional to the parameter value by factors $\sigma_{\delta\epsilon}$, $\sigma_{\delta\alpha}$ and $\sigma_{\delta\psi}$, which can be set by the user. It can also be assumed that these errors are independent parameter-to-parameter and band-to-band. The process can be easily modified to accommodate errors that are correlated parameter-to-parameter and band-to-band if such correlation coefficients are available.

The material identification method calculates an uncertainty in the candidate signatures attributable to NEF BRDF measurement errors based on the error covariance matrix supplied by the NEF database 250.

When a correct candidate is chosen, the expected value of the target reflectance signature $\hat{\rho}^t$ and the candidate reflectance signature $\hat{\rho}^c$ will be equal and the expected value of the difference signature is $\xi=0$. In this case, the $\chi^2$ statistic should have a chi-square distribution with number of degrees of freedom $v=N_{bands} \cdot N_{images}$. Denote the inverse cumulative distribution function by $Q_{\chi^2}$. For a given probability of detection $P_d$, a chi-square threshold x is set as shown in equation (1.6):

$$x = Q_{\chi^2}(P_d, v) \qquad (1.6)$$

When the incorrect candidate is chosen, the expected values of $\hat{\rho}^t$ and $\hat{\rho}^c$ will typically differ. In this case the $\chi^2$ statistic should have a non-central chi-square distribution with the same number of degrees of freedom $v=N_{bands} \cdot N_{images}$ as for the correct candidate, and with non-central parameter $\lambda=\chi^2$. Denote the cumulative distribution function by $P_{nc-\chi^2}$. Then the probability of false alarms $P_{fa}$ is calculated from the threshold x in accordance with equation (1.7):

$$P_{fa} = P_{nc-\chi^2}(x, v, \lambda) \qquad (1.7)$$

Three example applications for the performance prediction apparatus, system, and method described above illustrate how it characterizes the performance of the material identification method. In this particular example, each of the tests was executed for a desert scenario defined by the following parameters:

TABLE 1

| Parameter | Value |
| --- | --- |
| Sensor | Ikonos blue, green, red and NIR bands |
| AERONET aerosol type | Desert Dust |
| Visibility | 11 km |
| Sun elevation | 45° |
| Sensor elevation | 45° |
| Relative azimuths | 95° and 175° |
| NEF version | 12.1.2.6 |
| NEF background | natural-surface~soil~arid~playa |

The application described below illustrates the predicted performance of a remote material identification process utilizing spectral signatures of the same target acquired at or near specular geometry and the other at off specular geometry. Here, in this example, the PPT is used to simulate a ground truth collection for a target consisting of NEF material 0835UUUPNT, described as "silver-gray weathered paint chip (over tarpaper)". Additional parameters involved in the ground truth simulation are listed in Table 1. The sensor calibration uncertainty is taken to be 4% and the aerosol parameter uncertainty is taken to be 10%.

Execution of the PPT for these conditions determines the $P_{fa}$ values for each candidate NEF material corresponding to a $P_d$ value of 95%. The $P_{fa}$ is calculated for the target signature from each image separately and for the combined target signature. The results are shown in Tables 2.

Table 2 shows the three resulting $P_{fa}$ values for each NEF material, sorted by off-specular $P_{fa}$ value in decreasing order. The second column of this table shows that if only the off-specular image were available, the target would be confused with many incorrect candidate materials. When the near-specular image is also available, the $P_{fa}$ values in the second column drop to the values in the last column. The near-specular signature significantly suppresses false alarms for the listed NEF candidates.

TABLE 2

| Candidate Material | $P_{fa}$ for off-specular signature | $P_{fa}$ for near-specular signature | $P_{fa}$ for combined signature |
| --- | --- | --- | --- |
| 0724UUUPNT | 0.9341 | 0.012 | 0.0307 |
| 0122UUUALM | 0.91 | 0 | 0 |
| 0400UUUCNC | 0.8926 | 0 | 0 |
| 1004UUUCNC | 0.8766 | 0.0087 | 0.0203 |
| 0603UUUCNC | 0.8459 | 0 | 0 |
| 1312UUUALM | 0.807 | 0 | 0 |
| 0898UUUFAB | 0.6951 | 0 | 0 |
| 0971UUUCNC | 0.6559 | 0 | 0 |
| 0893UUUFAB | 0.5378 | 0 | 0 |
| 0588UUUCNC | 0.5236 | 0 | 0 |
| 0605UUUSTO | 0.5217 | 0 | 0 |
| 0838UUUPNT | 0.5033 | 0 | 0 |
| 0713UUUCNC | 0.4898 | 0 | 0 |
| 0014UUUALM | 0.3983 | 0 | 0 |
| 0899UUUFAB | 0.394 | 0 | 0 |
| 0671UUUCNC | 0.3692 | 0 | 0 |
| 0593UUUCNC | 0.2787 | 0 | 0 |
| 1074UUUFABa | 0.2585 | 0 | 0 |
| 1039UUUCNC | 0.2442 | 0 | 0 |
| 0864UUUCNC | 0.2141 | 0 | 0 |
| 0822UUUPNT | 0.2139 | 0 | 0 |
| 0490UUUASP | 0.2083 | 0 | 0 |
| 0677UUUCNC | 0.1892 | 0 | 0 |
| 0920UUUGRV | 0.1613 | 0 | 0 |
| 0892UUUFAB | 0.143 | 0 | 0 |
| 0915UUUCNC | 0.132 | 0 | 0 |
| 0420UUUSTL | 0.0623 | 0 | 0 |
| 0919UUUCNC | 0.0607 | 0 | 0 |
| 1040UUUCNC | 0.0563 | 0 | 0 |
| 0746UUUPNT | 0.0445 | 0 | 0 |

Table 3 shows the three resulting $P_{fa}$ values for each NEF material, sorted by near-specular $P_{fa}$ value in decreasing order. The third column of this table shows that if only the near-specular image were available, the target would be confused with many incorrect candidate materials. When the off-specular image is also available, the $P_{fa}$ values in the third column drop to the values in the last column. The off-specular signature significantly suppresses false alarms for the listed NEF candidates.

TABLE 3

| Candidate Material | $P_{fa}$ for off-specular signature | $P_{fa}$ for near-specular signature | $P_{fa}$ for combined signature |
|---|---|---|---|
| 0906UUUPNT | 0 | 0.9355 | 0 |
| 0798UUUGLS | 0 | 0.9077 | 0 |
| 0718UUUPNT | 0 | 0.8554 | 0 |
| 0526UUUSTLb | 0 | 0.7797 | 0 |
| 0878UUUPNT | 0 | 0.7784 | 0 |
| 0720UUUPNT | 0 | 0.6402 | 0 |
| 0832UUUPNT | 0 | 0.5859 | 0 |
| 0769UUUPNT | 0 | 0.5093 | 0 |
| 1052UUUCLR | 0 | 0.4904 | 0 |
| 0871UUUPNT | 0 | 0.4257 | 0 |
| 0536UUUSTDr | 0 | 0.4007 | 0 |
| 0493UUUSTDr | 0 | 0.367 | 0 |
| 0493UUUSTD | 0 | 0.3206 | 0 |
| 0753UUUPNT | 0 | 0.168 | 0 |
| 0886UUUPNT | 0 | 0.1593 | 0 |
| 0770UUUPNT | 0 | 0.1142 | 0 |
| 0834UUURBR | 0 | 0.0472 | 0 |
| 0876UUUPLS | 0 | 0.0203 | 0 |
| 0524UUUPNT | 0 | 0.018 | 0 |
| 0888UUUPNT | 0 | 0.018 | 0 |
| 0724UUUPNT | 0.9341 | 0.012 | 0.0307 |
| 0722UUUMBL | 0 | 0.0103 | 0 |
| 1004UUUCNC | 0.8766 | 0.0087 | 0.0203 |
| 1041UUUPNT | 0 | 0.0058 | 0 |
| 0707UUUPNT | 0 | 0.0035 | 0 |
| 0536UUUSTD | 0 | 0.0031 | 0 |
| 0872UUUPNT | 0 | 0.0031 | 0 |
| 0404UUUWOD | 0 | 0.003 | 0 |
| 0740UUUCNC | 0 | 0.0011 | 0 |
| 0867UUURBR | 0 | 0.001 | 0 |

Table 4 shows the three resulting $P_{fa}$ values for each NEF material, sorted by combined $P_{fa}$ value in decreasing order. It is clear from Tables 2-4 that the use of multi-angle signatures has given better identification results than either signature can give separately.

TABLE 4

| Candidate Material | $P_{fa}$ for off-specular signature | $P_{fa}$ for near-specular signature | $P_{fa}$ for combined signature |
|---|---|---|---|
| 0724UUUPNT | 0.9341 | 0.012 | 0.0307 |
| 1004UUUCNC | 0.8766 | 0.0087 | 0.0203 |
| 0122UUUALM | 0.91 | 0 | 0 |
| 0400UUUCNC | 0.8926 | 0 | 0 |
| 0603UUUCNC | 0.8459 | 0 | 0 |
| 1312UUUALM | 0.807 | 0 | 0 |
| 0898UUUFAB | 0.6951 | 0 | 0 |
| 0971UUUCNC | 0.6559 | 0 | 0 |
| 0893UUUFAB | 0.5378 | 0 | 0 |
| 0588UUUCNC | 0.5236 | 0 | 0 |
| 0605UUUSTO | 0.5217 | 0 | 0 |
| 0838UUUPNT | 0.5033 | 0 | 0 |
| 0713UUUCNC | 0.4898 | 0 | 0 |
| 0014UUUALM | 0.3983 | 0 | 0 |
| 0899UUUFAB | 0.394 | 0 | 0 |
| 0671UUUCNC | 0.3692 | 0 | 0 |
| 0593UUUCNC | 0.2787 | 0 | 0 |
| 1074UUUFABa | 0.2585 | 0 | 0 |
| 1039UUUCNC | 0.2442 | 0 | 0 |
| 0864UUUCNC | 0.2141 | 0 | 0 |
| 0822UUUPNT | 0.2139 | 0 | 0 |
| 0490UUUASP | 0.2083 | 0 | 0 |
| 0677UUUCNC | 0.1892 | 0 | 0 |
| 0920UUUGRV | 0.1613 | 0 | 0 |
| 0892UUUFAB | 0.143 | 0 | 0 |
| 0915UUUCNC | 0.132 | 0 | 0 |
| 0420UUUSTL | 0.0623 | 0 | 0 |
| 0919UUUCNC | 0.0607 | 0 | 0 |
| 1040UUUCNC | 0.0563 | 0 | 0 |
| 0746UUUPNT | 0.0445 | 0 | 0 |

Second, the performance prediction method and apparatus can be used by the systems designer to determine the sensor calibration uncertainty and aerosol uncertainty needed to achieve a given performance level of a material identification method and apparatus. Assume that the material identification method performance level is formulated by a required probability of false alarms ($P_{fa\text{-}required}$) at a given $P_d$ value. In this section, the values $P_d=95\%$ and $P_{fa\text{-}required}=5\%$ will be used for the sake of example.

In order to simplify results, identification performance can be reformulated in terms of the "number of incorrect matches", as follows. For each candidate material in the NEF, the PPT allows the designer to predict its actual probability of false alarms ($P_{fa\text{-}actual}$) at a given $P_d$. (Note that $P_{fa\text{-}actual}$ will vary with sensor calibration uncertainty and aerosol uncertainty.) In the event that $P_{fa\text{-}actual}$ exceeds $P_{fa\text{-}required}$, the target cannot be distinguished from the candidate material, and the candidate material will then be deemed an "incorrect match". The predicted performance example given above can be re-expressed in these terms as an example. FIG. 5 shows that when the target consists of NEF material 0835UUUPNT, the largest value over all candidate materials of $P_{fa\text{-}actual}$ was 3% if the sensor calibration accuracy is 4% and the aerosol uncertainty is 10%. Consequently, there are no incorrect matches and the target can be distinguished from all candidate materials.

The performance prediction method is then repeated for varying values of sensor calibration uncertainty and aerosol uncertainty. The sensor calibration uncertainty ranged from 0% to 10% in 2% increments, and the aerosol uncertainty ranged from 0% to 30% in 5% increments. The numbers of incorrect matches were determined, and for each sensor calibration uncertainty value the results are displayed on a graph versus aerosol uncertainty, as shown in FIG. 5. This graph allows the system designer to trade off sensor calibration uncertainty and aerosol parameter uncertainty to achieve a given level of performance.

The performance prediction tool can also be repeated with different target materials drawn from the NEF database. Table 5 shows results with a sensor radiometric calibration uncertainty value of 4%, but with aerosol uncertainty varying from 0 to 30% in 5% increments. The numbers of incorrect matches for the first 30 target materials vs. aerosol uncertainty are shown in Table 5.

TABLE 5

Results for other target materials using both images

| Material | Aerosol uncertainty | | | | | | |
|---|---|---|---|---|---|---|---|
| | 0 | 5% | 10% | 15% | 20% | 25% | 30% |
| 0404UUUWOD | 0 | 0 | 0 | 0 | 0 | 0 | 0 |
| 0430UUUPNT | 0 | 0 | 0 | 0 | 0 | 0 | 0 |
| 0494UUUSTD | 0 | 0 | 0 | 0 | 0 | 0 | 0 |
| 0607UUUPNT | 0 | 0 | 0 | 0 | 0 | 0 | 0 |
| 0841UUUPNT | 0 | 0 | 0 | 0 | 0 | 0 | 0 |
| 1144UUUSTL | 0 | 0 | 0 | 0 | 0 | 0 | 0 |
| 1308UUUPNT | 0 | 0 | 0 | 0 | 0 | 0 | 0 |
| 1323UUUPNT | 0 | 0 | 0 | 0 | 0 | 0 | 0 |
| 0511UUUPNT | 0 | 0 | 0 | 0 | 0 | 0 | 1 |
| 1302UUUPNT | 0 | 0 | 0 | 0 | 0 | 0 | 1 |
| 1305UUUPLS | 0 | 0 | 0 | 0 | 0 | 0 | 1 |
| 0407UUUPNT | 0 | 0 | 0 | 0 | 0 | 1 | 1 |
| 0838UUUPNT | 0 | 0 | 0 | 0 | 0 | 1 | 2 |
| 0122UUUALM | 0 | 0 | 0 | 0 | 0 | 2 | 3 |
| 0874UUUCER | 0 | 0 | 0 | 0 | 1 | 1 | 1 |
| 1053UUUMSC | 0 | 0 | 0 | 0 | 1 | 1 | 2 |
| 0668UUUPNTb | 0 | 0 | 0 | 0 | 1 | 2 | 3 |
| 0835UUUPNT | 0 | 0 | 0 | 1 | 1 | 1 | 1 |

TABLE 5-continued

Results for other target materials using both images

| | Aerosol uncertainty | | | | | | |
|---|---|---|---|---|---|---|---|
| Material | 0 | 5% | 10% | 15% | 20% | 25% | 30% |
| 0879UUUMSC | 0 | 0 | 0 | 1 | 1 | 1 | 1 |
| 1074UUUFABb | 0 | 0 | 0 | 1 | 1 | 1 | 2 |
| 1014UUUFIG | 0 | 0 | 0 | 1 | 1 | 1 | 3 |
| 0408UUUPNT | 0 | 0 | 0 | 1 | 1 | 2 | 2 |
| 0776UUUALM | 0 | 0 | 0 | 1 | 2 | 2 | 2 |
| 0419UUUPNT | 0 | 0 | 0 | 1 | 2 | 3 | 3 |
| 0997UUUPNT | 0 | 0 | 0 | 1 | 2 | 4 | 6 |
| 0887UUUPNT | 0 | 0 | 0 | 2 | 2 | 2 | 2 |
| 1019UUUFABc | 0 | 0 | 1 | 1 | 1 | 1 | 1 |
| 0746UUUPNT | 0 | 0 | 1 | 1 | 1 | 2 | 2 |
| 1074UUUFABa | 0 | 0 | 1 | 1 | 2 | 2 | 2 |
| 0877UUUPLS | 0 | 0 | 1 | 1 | 2 | 2 | 3 |

The results shown in Table 5 can provide performance information to the system designer and the consumer of the imagery. It is clear from the table that this material identification method can successfully distinguish many target materials from all other candidate materials in the NEF database, given sufficiently accurate sensor and aerosol parameters. The table lists the level of aerosol uncertainty required to achieve this for each material. This is useful to the system designer in setting system requirements on aerosol knowledge. It is also useful to the consumer of the imagery in determining whether a given set of data will allow a specific target material to be identified.

The foregoing description is of exemplary and preferred embodiments employing at least in part certain teachings of the invention. The invention, as defined by the appended claims, is not limited to the described embodiments. Alterations and modifications to the disclosed embodiments may be made without departing from the invention. The meaning of the terms used in this specification, unless expressly stated otherwise, are intended to have ordinary and customary meaning, and are not intended to be limited to the details of the illustrated structures or the disclosed embodiments.

What is claimed is:

1. An implemented method for predicting a performance of a remote sensor material identification process under one or more given environmental condition and at least one uncertainty, the remote material identification process being used for automatically identifying a preselected target material within imagery acquired from one or more remote sensors, the method comprising:
   setting at least one environmental parameter representative of the one or more environmental conditions and at least one uncertainty associated with at least one of the environmental parameters, or calibration of the one or more remote sensors;
   simulating, by a specially programmed computer processor, a "true" target spectral radiance at least one acquisition angle under the one or more environmental conditions, the target being made of a preselected material, the simulating being based on the at least one environmental parameter, a type of sensor, and a previously measured reflectance function for the preselected target material;
   performing, by the specially programmed computer processor, the remote material identification process using:
   a) the "true" target spectral radiance at the at least one acquisition angle,
   b) at least one environmental parameter,
   c) the material reflectance database, and
   d) at least one uncertainty to determine an estimated target signature and uncertainty associated with the estimated target signature,
   wherein the material identification process further identifies the target material by comparing:
   the estimated target signature with,
   a predicted spectral signature for each of at least one candidate material at each of at least one acquisition angle, the predicted spectral signature being determined by using 1) BRDF for the candidate material, 2) the environmental parameter, and 3) an uncertainty associated with the BRDF for the candidate material; and
   determining, by the specially programmed computer processor, a probability of a false identification, using results of said remote material identification process.

2. The computer-implemented method of claim 1, further comprising:
   varying one or more of the at least one environmental parameter and at least one uncertainty while iteratively repeating said setting, simulating, performing, and determining for the preselected target material.

3. The computer-implemented method of claim 2, further comprising:
   repeating said varying for each of a plurality of preselected target materials.

4. The computer-implemented method of claim 3, further comprising:
   communicating results of at least one said determining, said varying, or said repeating to a user.

5. The computer-implemented method of claim 4, wherein said user is at least one of a designer of a material identification system or a consumer of image analysis results produced by the remote material identification process.

6. The computer-implemented method of claim 1, further comprising:
   receiving numerous types of input from a user via a user interface of the specially programmed computer processor, including the at least one environmental parameter and the at least one uncertainty.

7. The computer-implemented method of claim 1, further comprising:
   receiving a probability of detection from the user via the user interface of the specially programmed computer processor, wherein said performing the remote material identification process includes utilizing the probability of detection to generate the results of said performing the remote material identification process.

8. The computer-implemented method of claim 1, wherein the imagery is one or more of the following types:
   (a) non-polarimetric reflective and/or emissive, multi-spectral (MS) or hyperspectral (HS);
   (b) polarimetric spectral reflective and/or emissive, MS or HS; or
   (c) synthetic aperture radar.

9. The computer-implemented method of claim 1, wherein said multi-angle material identification process is non-polarimetric reflective and/or emissive (MS), and said simulating involves determining at least two sets of atmospheric correction terms, including background dependent path terms and aperture effective values.

10. The computer-implemented method of claim 9, wherein the background dependent path terms are determined by:
   generating spectral background independent path terms from aerosol properties, the aerosol properties including absorption, asymmetry, and extinction;

acquiring from a BRDF database directional hemispherical spectral reflectance of a Lambertian background as a function of wavelength; and utilizing the directional hemispherical spectral reflectance to convert the background independent path terms to the background dependent path terms.

11. The computer-implemented method of claim 9, wherein the aperture effective values are determined by:

generating a BRDF atmosphere from aerosol properties, the aerosol properties including absorption, asymmetry, and extinction; and using the BRDF atmosphere and the BRDF database to obtain aperture effective values, including directional hemispherical reflectance of the background, directional hemispherical reflectance of the target, Lambertian-equivalent solar reflectance of the background, and Lambertian-equivalent solar reflectance of the target.

12. The computer-implemented method of claim 9, further comprising:

determining background and target radiances using the background dependent path terms and the aperture effective values.

13. The computer-implemented method of claim 12, wherein said performing the remote material identification process includes determining an uncertainty in candidate signatures attributable to BRDF measurement errors based on an error covariance matrix supplied by the BRDF database.

14. The computer-implemented method of claim 13, wherein said performing the remote material identification process includes determining a chi-squared threshold for a given probability of detection.

15. The computer-implemented method of claim 14, wherein said determining the probability of the misidentification includes observing the chi-squared threshold in evaluating a cumulative distribution of target reflectance signatures and candidate reflectance signatures.

16. An apparatus for predicting a performance of a remote sensor material identification process under one or more given environmental condition and at least one uncertainty, the remote material identification process being used for automatically identifying a preselected target material within imagery acquired from one or more remote sensors, the method comprising:

means for setting at least one environmental parameter representative of the one or more environmental conditions and at least one uncertainty associated with at least one of the environmental parameter, or calibration of the one or more remote sensors;

means for simulating a "true" target spectral radiance of at least one acquisition angle under the one or more environmental conditions, the target being made of a preselected material, the simulating being based on the at least one environmental parameter, a type of sensor, and a previously measured reflectance function for the preselected target material;

means for performing the remote material identification process using:
a) the "true" target spectral radiance at the at least one acquisition angle,
b) the at least one environmental parameter,
c) the material reflectance database, and
d) the at least one uncertainty to determine an estimated target signature and uncertainty associated with the estimated target signature, wherein the material identification process further identifies the target material by comparing:
the estimated target signature with,
a predicted spectral signature for each of at least one candidate material at each of the at least one acquisition angle, the predicted spectral signature being determined by using 1) BRDF for the candidate material, 2)
the environmental parameter, and 3)
an uncertainty associated with the BRDF for the candidate material; and means for determining a probability of a false identification, using results of said remote material identification process.

17. The apparatus of claim 16, further comprising:

means for varying one or more of the at least one environmental parameter and the at least one uncertainty while iteratively repeating said setting, simulating, performing, and determining for the preselected target material.

18. The apparatus of claim 17, further comprising:

means for repeating said varying for each of a plurality of preselected target materials.

19. The apparatus of claim 18, further comprising:

means for communicating results of at least one said determining, said varying, or said repeating to a user.

20. The apparatus of claim 19, wherein said user is at least one of designer of a material identification system or a consumer of image analysis results produced by the remote material identification process.

21. The apparatus of claim 16, further comprising:

means for receiving numerous types of input from a user via a user interface of the specially programmed computer processor, including the at least one environmental parameter and the at least one uncertainty.

22. The apparatus of claim 16, further comprising:

means for receiving a probability of detection from the user via the user interface of the specially programmed computer processor, wherein said performing the remote material identification process includes utilizing the probability of detection to generate the results of said performing the remote material identification process.

23. The apparatus of claim 16, wherein said imagery is one or more of the following types:

(a) non-polarimetric reflective and/or emissive, multispectral (MS) or hyperspectral (HS);
(b) polarimetric spectral reflective and/or emissive, MS or HS; or
(c) synthetic aperture radar.

24. The apparatus of claim 16, wherein said multi-angle material identification process is non-polarimetric reflective and/or emissive (MS), and said means for simulating determines at least two sets of atmospheric correction terms, including background dependent path terms and aperture effective values.

25. The apparatus of claim 24, wherein said means for simulating determines the background dependent path terms by:

generating spectral background independent path terms from aerosol properties, the aerosol properties including absorption, asymmetry, and extinction;

acquiring from a BRDF database directional hemispherical spectral reflectance of a Lambertian background as a function of wavelength; and utilizing the directional hemispherical spectral reflectance to convert the background independent path terms to the background dependent path terms.

26. The apparatus of claim 24, wherein said means for simulating determines the aperture effective values by:

generating a BRDF atmosphere from aerosol properties, the aerosol properties including absorption, asymmetry, and extinction; and passing the BRDF atmosphere to the BRDF database to obtain aperture effective values, including directional hemispherical reflectance of the background, directional hemispherical reflectance of the target, Lambertian-equivalent solar reflectance of the background, and Lambertian-equivalent solar reflectance of the target.

27. The apparatus of claim 24, wherein said means for simulating determines background and target radiances using the background dependent path terms and the aperture effective values.

28. The apparatus of claim 27, wherein said means for performing the remote material identification process calculates an uncertainty in candidate signatures attributable to BRDF measurement errors based on an error covariance matrix supplied by a BRDF database.

29. The apparatus of claim 28, wherein said means for performing the remote material identification process determines a chi-squared threshold for a given probability of detection.

30. The apparatus of claim 29, wherein said means for determining the probability of the misidentification observes the chi-squared threshold in evaluating a cumulative distribution of target reflectance signatures and candidate reflectance signatures.

31. A non-transitory computer readable media carrying program instructions that, when executed by one or more computers, perform a method for predicting a performance of a remote sensor material identification process under one or more given environmental condition and at least one uncertainty, the remote material identification process being used for automatically identifying a preselected target material within imagery acquired from one or more remote sensors, the method comprising:

setting at least one environmental parameter representative of the one or more environmental conditions and at least one uncertainty associated with at least one of the environmental parameter, or calibration of the one or more remote sensors;

simulating, by a specially programmed computer processor, a "true" target spectral radiance of at least one acquisition angle under the one or more environmental conditions, the target being made of a preselected material, the simulating being based on the at least one environmental parameter, a type of sensor, and a previously measured reflectance function for the preselected target material;

performing, by the specially programmed computer processor, the remote material identification process using:
a) the "true" target spectral radiance at the at least one acquisition angle,
b) the at least one environmental parameter,
c) the material reflectance database, and
d) the at least one uncertainty to determine an estimated target signature and uncertainty associated with the estimated target signature, wherein the material identification process further identifies the target material by comparing:
the estimated target signature with,
a predicted spectral signature for each of at least one candidate material at each of the at least one acquisition angle,
the predicted spectral signature being determined by using 1) BRDF for the candidate material, 2) the environmental parameter, and 3) an uncertainty associated with the BRDF for the candidate material; and determining, by the specially programmed computer processor, a probability of a false identification, using results of said remote material identification process.

32. The non-transitory computer readable media of claim 31, wherein the method further comprises:
varying one or more of the at least one environmental parameter and the at least one uncertainty while iteratively repeating said setting, simulating, performing, and determining for the preselected target material.

33. The non-transitory computer readable media of claim 32, wherein the method further comprises:
repeating said varying for each of a plurality of preselected target materials.

34. The non-transitory computer readable media of claim 33, wherein the method further comprises:
communicating results of at least one said determining, said varying, or said repeating to a user.

35. The non-transitory computer readable media of claim 34, wherein said user is at least one of designer of a material identification system or a consumer of image analysis results produced by the remote material identification process.

36. The non-transitory computer readable media of claim 31, wherein the method further comprises:
receiving numerous types of input from a user via a user interface of the specially programmed computer processor, including the at least one environmental parameter and the at least one uncertainty.

37. The non-transitory computer readable media of claim 31, wherein the method further comprises:
receiving a probability of detection from the user via the user interface of the specially programmed computer processor, wherein said performing the remote material identification process includes utilizing the probability of detection to generate the results of said performing the remote material identification process.

38. The non-transitory computer readable media of claim 31, wherein the imagery is one or more of the following types:
(a) non-polarimetric reflective and/or emissive, multispectral (MS) or hyperspectral (HS);
(b) polarimetric spectral reflective and/or emissive, MS or HS; or
(c) synthetic aperture radar.

39. The non-transitory computer readable media of claim 31, wherein said multi-angle material identification process is non-polarimetric reflective and/or emissive (MS), and said simulating involves determining at least two sets of atmospheric correction terms, including background dependent path terms and aperture effective values.

40. The non-transitory computer readable media of claim 39, wherein the background dependent path terms are determined by:
generating spectral background independent path terms from aerosol properties, the aerosol properties including absorption, asymmetry, and extinction;
acquiring from a BRDF database directional hemispherical spectral reflectance of a Lambertian background as a function of wavelength; and
utilizing the directional hemispherical spectral reflectance to convert the background independent path terms to the background dependent path terms.

41. The non-transitory computer readable media of claim 39, wherein the aperture effective values are determined by:
generating a BRDF atmosphere from aerosol properties, the aerosol properties including absorption, asymmetry, and extinction; and using the BRDF atmosphere to the BRDF database to obtain aperture effective values, including directional hemispherical reflectance of the background, directional hemispherical reflectance of the target, Lambertian-equivalent solar reflectance of the background, and Lambertian equivalent solar reflectance of the target.

42. The non-transitory computer readable media of claim 39 further comprising:
determining background and target radiances using the background dependent path terms and the aperture effective values.

43. The non-transitory computer readable media of claim 32, wherein said performing the remote material identification process includes determining an uncertainty in candidate signatures attributable to BRDF measurement errors based on an error covariance matrix supplied by a BRDF database.

44. The non-transitory computer readable media of claim 33, wherein said performing the remote material identification process includes determining a chi-squared threshold for a given probability of detection.

45. The non-transitory computer readable media of claim 34, wherein said determining the probability of the misidentification includes observing the chi-squared threshold in evaluating a cumulative distribution of target reflectance signatures and candidate reflectance signatures.

* * * * *

UNITED STATES PATENT AND TRADEMARK OFFICE
CERTIFICATE OF CORRECTION

PATENT NO. : 8,515,716 B2
APPLICATION NO. : 12/851844
DATED : August 20, 2013
INVENTOR(S) : Ingram et al.

Page 1 of 3

It is certified that error appears in the above-identified patent and that said Letters Patent is hereby corrected as shown below:

On the title page, in column 1, Item (56) under "Other Publications", line 1, delete "al." and insert --al.,--, therefor On the title page, in column 1, Item (56) under "Other Publications", line 4, delete "al." and insert --al.,--, therefor On the title page, in column 2, Item (56) under "Other Publications", line 1, delete "al." and insert --al.,--, therefor On the title page, in column 2, Item (56) under "Other Publications", line 5, delete "al." and insert --al.,--, therefor On title page 2, in column 2, Item (56) under "Other Publications", line 20, delete "J," and insert --J.,--, therefor On title page 2, in column 2, Item (56) under "Other Publications", line 21, delete "Aplied" and insert --Applied--, therefor On title page 2, in column 2, Item (56) under "Other Publications", line 27, delete "E," and insert --E.,--, therefor On title page 2, in column 2, Item (56) under "Other Publications", line 29, delete "A," and insert --A.,--, therefor On title page 2, in column 2, Item (56) under "Other Publications", line 32, delete "1,," and insert --1,--, therefor Signed and Sealed this
Eleventh Day of November, 2014

Michelle K. Lee
*Deputy Director of the United States Patent and Trademark Office*

In the Specification

In column 4, line 38, delete "image" and insert --image.--, therefor

In column 4, line 39, delete "scenes" and insert --scenes.--, therefor

In column 4, line 40, delete "uncertainties" and insert --uncertainties.--, therefor In column 4, line 42, delete "uncertainties" and insert --uncertainties.--, therefor In column 4, line 43, delete "uncertainties" and insert --uncertainties.--, therefor In column 4, line 44-45, delete "uncertainties" and insert --uncertainties.--, therefor In column 4, line 49, delete "(HS)" and insert --(HS).--, therefor In column 4, line 50, delete "HS" and insert --HS.--, therefor In column 4, line 52, delete "modalities" and insert --modalities.--, therefor In column 7, line 10-11, delete "background" and insert --background.--, therefor In column 7, line 12, delete "target" and insert --target.--, therefor In column 7, line 14, delete "background" and insert --background.--, therefor In column 7, line 16, delete "target" and insert --target.--, therefor In column 9, line 4, delete "$\hat{\epsilon}=\hat{\epsilon}_\lambda=\hat{\alpha}=\hat{\alpha}_\lambda$" and insert --$\hat{\epsilon}=\hat{\epsilon}_\lambda, \hat{\alpha}=\hat{\alpha}_\lambda$--, therefor In column 9, line 4, delete "$\hat{\psi}=\hat{\psi}_\lambda \text{have}$" and insert --$\hat{\psi}=\hat{\psi}_\lambda \text{ have}$--, therefor

In the Claims

In column 14, line 10, in Claim 1, delete "2)¶" and insert --¶2)--, therefor

In column 14, line 11, in Claim 1, delete "3)¶" and insert --¶3)--, therefor

In column 16, line 5, in Claim 16, delete "2)¶" and insert --¶2)--, therefor

In column 16, line 6, in Claim 16, delete "3)¶" and insert --¶3)--, therefor

In column 17, line 62, in Claim 31, after "of", insert --the--, therefor

CERTIFICATE OF CORRECTION (continued)
U.S. Pat. No. 8,515,716 B2

In column 17, line 66, in Claim 31, delete "2)¶" and insert --¶2)--, therefor

In column 17, line 67, in Claim 31, delete "3)¶" and insert --¶3)--, therefor